(12) United States Patent
Nangreaves et al.

(10) Patent No.: US 8,125,806 B2
(45) Date of Patent: Feb. 28, 2012

(54) MULTI-STAGE SWITCHING POWER SUPPLY

(75) Inventors: Kirk Nangreaves, Dearborn, MI (US); Charles-Lizhi Zhu, Canton, MI (US); Richard Joseph Hampo, Plymouth, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 513 days.

(21) Appl. No.: 12/359,717

(22) Filed: Jan. 26, 2009

(65) Prior Publication Data

US 2009/0190380 A1 Jul. 30, 2009

Related U.S. Application Data

(60) Provisional application No. 61/062,252, filed on Jan. 24, 2008.

(51) Int. Cl.
*H02M 3/24* (2006.01)
(52) U.S. Cl. ............................ 363/95; 363/65; 323/906
(58) Field of Classification Search .................. 363/34, 363/37, 56.01, 65, 70, 95–98, 131; 323/222, 323/282, 285, 210, 211; 320/101, 120, 130, 320/138; 315/291, 307, 224, 276
See application file for complete search history.

(56) References Cited

U.S. PATENT DOCUMENTS

| | | | | | |
|---|---|---|---|---|---|
| 4,954,726 | A | * | 9/1990 | Lipman et al. | 307/46 |
| 5,006,973 | A | * | 4/1991 | Turner | 363/34 |
| 5,576,941 | A | * | 11/1996 | Nguyen et al. | 363/21.07 |
| 5,912,552 | A | * | 6/1999 | Tateishi | 323/285 |
| 6,448,489 | B2 | * | 9/2002 | Kimura et al. | 136/244 |
| 6,534,933 | B2 | * | 3/2003 | Shen | 315/307 |

FOREIGN PATENT DOCUMENTS

EP 1 705 790 A2 9/2006
GB 2 419 968 A 5/2006

OTHER PUBLICATIONS

International Search Report for PCT Application No. PCT/US2009/031952, May 7, 2009.
Luk, P.C.K, et al., "Experimental Investigations into the Dual-Randomization PWM Scheme for Power Converters," 2004 35th Annual IEEE Power Electronics Specialists Conference, Aachen, Germany, Jun. 20, 2004, vol. 6, pp. 4209-4213, XP010739080.

* cited by examiner

*Primary Examiner* — Rajnikant Patel

(57) ABSTRACT

A multi-stage power supply uses a boost stage and an inverter stage to boost the voltage value of a DC power supply to a desired level, and then convert the power into an AC form. The multi-stage power supply additionally has a controller which can simultaneously control the boost stage and the inverter stage using counter-synchronous signals.

17 Claims, 1 Drawing Sheet

MULTI-STAGE SWITCHING POWER SUPPLY

The application claims priority to U.S. Provisional Application No. 61/062,252 which was filed on Jan. 24, 2008.

BACKGROUND OF THE INVENTION

The present application relates generally to the field of DC to AC power supplies, and more specifically to the field of multi-stage inverter power supplies.

Many applications, such as hydrogen fuel-cell vehicles utilize low voltage power sources. In the case of a hydrogen fuel-cell vehicle the power source is the fuel-cell, however, other applications could use any number of other low voltage DC power sources such as a battery. These power sources often have a limited time at which they can retain their original maximum charge, and after that time the maximum charge which can be retained decreases steadily over time.

Current switching inverter technology uses single phase switching inverters where the DC power is directly converted into AC power for use with the vehicle or other system. The direct conversion results in a system where the amplitude of the AC output is directly proportional to the amplitude of the DC input at all times. In order to utilize a DC power source for longer, it is necessary to have a means of ensuring that the output voltage of the switching inverter phase has a constant peak to peak value, despite a decrease in output potential of the DC power source.

Current inverting electric power supplies do not include ways to boost the voltage of a power supply whose maximum charge has decreased due to time or other factors, and as such the power supplies utilized in conjunction with the inverting electric power supplies must be replaced frequently.

An additional side affect of current switching inverter technology is a large amount of electric noise which is introduced into the AC signal as a result of the switching. Maintaining the output signal at a constant frequency results in a large noise spike at that frequency. The presence of electrical noise in the AC signal output can interfere with the functions of a vehicle system, or any other system.

SUMMARY OF THE INVENTION

Disclosed is a multi-stage switching power supply. The power supply has an overvoltage protection circuit, two switching stages, and a controller. The first switching stage is a boost stage which increases the DC voltage potential received from the overvoltage protection circuit, and the second switching stage is an inverter stage which accepts the output of the boost stage as an input, and outputs a waveform power signal meeting desired characteristics. Additionally part of the multi-stage switching power supply is a controller which can control both stages simultaneously using counter synchronized control signals.

These and other features of the present invention can be best understood from the following specification and drawings, the following of which is a brief description.

DETAILED DESCRIPTION OF THE PREFERRED EMBODIMENT

Figure 1:
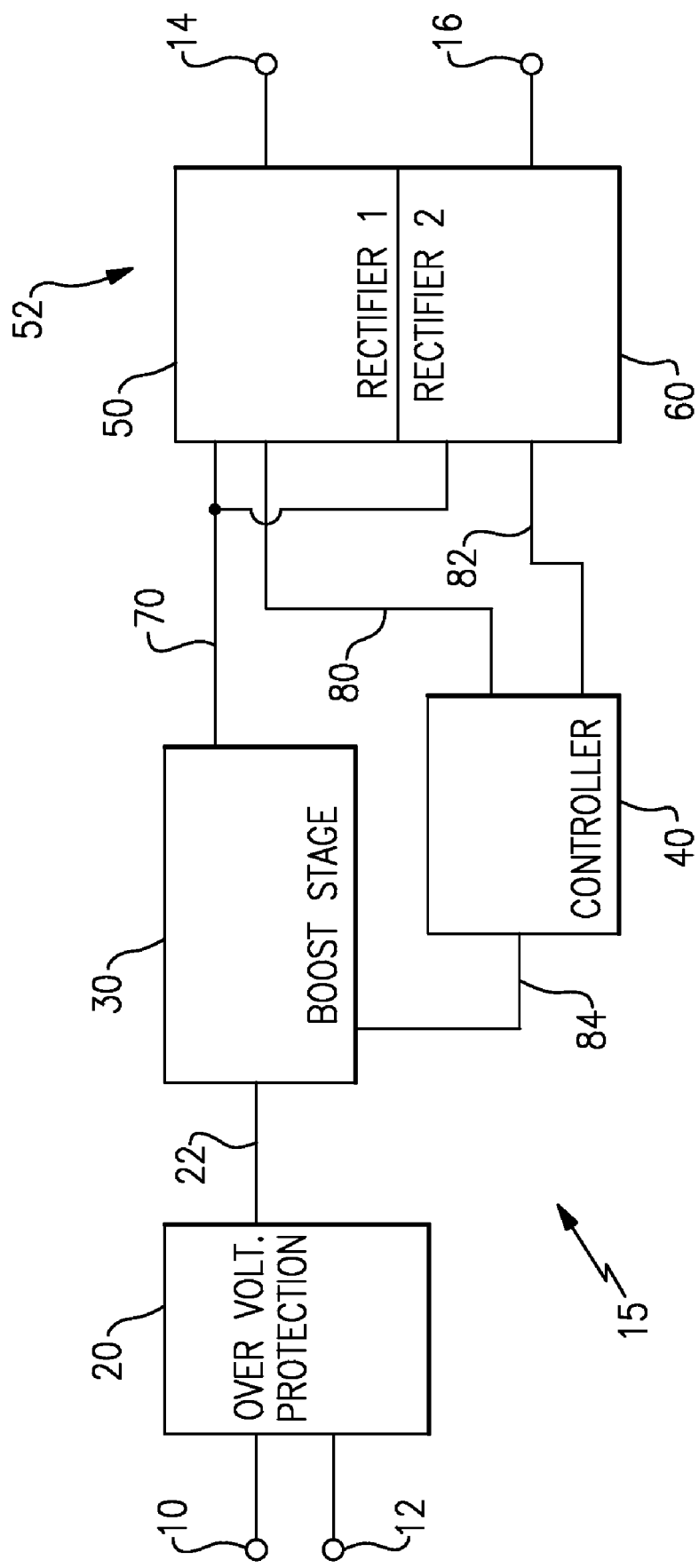
FIG. 1 illustrates a block diagram of an example multi stage inverter power supply.

Referring to FIG. 1, a two stage inverter circuit 15 for a power supply is illustrated. The two stage inverter circuit comprises a set of nodes 10, 12 which connect an over voltage protection circuit 20 to a DC power source (not pictured). The over voltage protection circuit 20 outputs a power signal 22 to a boost stage 30. The boost stage 30 additionally has an input for a control signal 84 and a boosted power line 70. The boosted power line 70 connects to an inverter stage 52. The example inverter stage 52 of FIG. 1 comprises two ½ bridge rectifiers 50, 60. Each of the ½ bridge rectifiers 50, 60 additionally have a control signal input 80, 82 and an AC power output node 14, 16. The Ac power output nodes 14, 16 are connected to an AC bus which can then be connected to multiple load leads, thereby providing AC power to a plurality of loads.

The over voltage protection circuit 20 connects to a +DC voltage bus of a power source at node 10 and a −DC voltage bus of the power source at node 12. The overprotection circuit 20 can be of any known configuration. The nodes 10, 12 provide DC power to the overvoltage protection circuit 20. The overvoltage protection circuit 20 detects the DC voltage from the input nodes 10, 12 and disconnects power to the remainder of the inverter circuit 15 if the detected DC voltage exceeds a threshold. The disconnect can be done using either an electrical switch (such as a transistor) or a mechanical switch. As long as the voltage potential across the nodes 10, 12 is below the threshold, the overvoltage protection circuit 20 outputs a DC power signal 22 equal to the DC voltage across nodes 10 and 12 to a boost stage 30 of the power supply.

The boost stage 30 accepts an input DC power signal 22 and a control signal 84. The boost stage 30 then increases the voltage potential of the DC power signal while still maintaining the signal's DC characteristics. The resulting output is a boosted voltage signal 70 which has a higher potential than the input DC power signal 22.

In order to improve efficiency, a relatively low boost can be used, such as boosting a 12V DC power signal 22 into a 15V DC boosted voltage signal 70. The magnitude of the boosted voltage signal 70 is determined by a boost stage control signal 84 which is output from a controller 40. Since the magnitude of the boosted voltage signal 70 is controlled independent of the magnitude of the boost stage's 30 input DC power signal 22, the particular charge level of the power source connected to nodes 10 and 12 can vary, without affecting the output of the boost stage 30. Thus allowing for any type of DC power sources to be used, including fuel cells, or other similar DC power sources which have a decreased maximum DC output potential over time.

After the DC power signal 22 has been boosted to a desired level in the boost stage 30, the boosted voltage signal 70 enters an inverter stage 52. The inverter stage 52, depicted in the example of FIG. 1, comprises the two ½ bridge rectifiers 50 and 60. Each ½ bridge rectifier stage 50, 60 accepts an input of the boosted DC voltage signal 70 and a control signal 80, 82 from the controller 40.

The control signals 80, 82 used in the example of FIG. 1 are square wave counter synchronous signals. Counter synchronous signals are waveform signals that are identical to each other, with the exception of a constant phase shift. In the example of FIG. 1, the control signal 82 is identical to the control signal 80 with the exception of a phase shift of 180 degrees.

Since the control signals 80, 82 are phase shifted by 180 degrees, the first ½ bridge rectifier 50 will output a positive voltage signal when the second ½ bridge rectifier 60 is outputting a 0 voltage signal. Likewise, when the second ½ bridge rectifier 60 is outputting a negative voltage signal, the first ½ bridge rectifier 50 will output a 0 voltage signal. This results in a waveform power output (i.e. AC power) across the output nodes 14, 16. The control signal inputs 80, 82 additionally ensure that the output across the output nodes 14, 16 has a desired frequency. The output from the nodes 14, 16 can then be connected to an AC bus and provide a desired waveform to any number of load leads connected to the AC bus.

The controller 40 used to control the boost stage 30 and the inverter stage 52 can be any known controller capable of outputting multiple control signals having a frequency that varies randomly within a defined range. The controller 40 used in the example of FIG. 1 is also capable of outputting a plurality of counter-synchronous AC signals based on the signal generated by a dithering oscillator.

An additional advantage is recognized by using the counter-synchronous control signals 80, 82, 84 in that the counter-synchronous nature optimizes the electromagnetic properties of the power supply by reducing the electromagnetic interference and the electromagnetic noise generated as a result of the control signals. This advantage is realized because having a signal which is 90 degrees out of phase reduces concurrent electromagnetic noise. A significant source of electrical noise resulting from the control signals occurs when the signals switch from high to low or vice versa. This relationship is especially true in the case of a square wave. By placing the boost stage 30 control signal 84 90 degrees out of phase with each of the inverter stage 52 control signals 80, 82, it is insured that the control signal 84 for the boost stage 30 will always switch at a different time than the control signals 80,82 for the inverter stage 52. This reduces the amount of noise which will be present on the system at any given time, thereby keeping the overall noise level within acceptable tolerances.

An additional noise reduction feature which can be implemented alongside the counter synchronous control signals is that the frequency of the output waveform can be varied between an acceptable range of frequencies where the center of the range is an optimal frequency. By varying the frequency range of the output within a defined tolerance, electric noise which would be concentrated on a single frequency is spread out over a larger frequency band. The frequency range results in a smaller quantity of electric noise on any given frequency, and improves performance. By way of example, if a user desired a 200 kHz frequency AC power source with a tolerance of 20 kHz, the controller would vary the control signal frequencies between 180 kHz and 220 kHz giving an average frequency of 200 kHz.

The frequency range variation for the control signals 80, 82, 84 described above, can be achieved using any known controller capable of randomly varying the frequency of the control signals 80, 82, 84 while still maintaining a desired average frequency. One type of controller capable of doing this uses a multi-phase oscillator circuit which is capable of dithering and synchronizing its output signals. An oscillator circuit which implements a dithering feature is one including a randomization element which is capable of randomly varying the frequency of the output within a desired range. Since a multi-phase dithering oscillator circuit is capable of outputting multiple control signals, it is possible to control the inverter stages 50, 60 and the boost stage 30 with a single circuit thereby reducing the number of components required and reducing the cost. Controllers utilizing dithering oscillators are known in the art.

While it is known that any type waveform may be utilized with the above disclosed apparatus, one embodiment uses a square wave. The utilization of a square wave provides benefits over other waveforms, such as simplifying the inverter topology and reducing the necessary size of any rectifier output capacitors. Inverter topologies for use with a square wave are known in the art.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A multi-stage switching power supply comprising;
   an overvoltage protection circuit connected to a low voltage DC power source;
   a first switching stage comprising a boost stage, wherein the boost stage is connected to said overvoltage protection circuit and a control signal and said boost stage is capable of receiving a power signal from said overvoltage protection circuit, amplifying the voltage of the power signal, and outputting a boosted power signal;
   a second switching stage comprising an inverter stage, wherein the inverter stage is connected to a boosted power signal and at least one control signal and said inverter stage is capable of outputting a waveform power signal, wherein said waveform power signal's wave characteristics depend on said at least one control signal;
   a controller capable of outputting at least a first control signal for controlling said inverter stage, and a control signal for controlling said boost stage; and
   wherein said control signals comprise counter-synchronized control signals.

2. The power supply of claim 1, wherein said inverter stage comprises a first half bridge inverter and a second half bridge inverter.

3. The power supply of claim 1, wherein said controller is capable of outputting a second control signal for controlling an inverter stage.

4. The multi-stage power supply of claim 3, wherein said first and second control signals for controlling an inverter stage have a phase offset from each other of 180°.

5. The multi-stage power supply of claim 4, wherein said control signal for controlling said boost stage has a phase offset from both the first control signal and the second control signal of 90°.

6. The multi-stage power supply of claim 1, wherein said controller comprises a dithering oscillator capable of randomly varying a frequency of each of said control signals between a range of frequencies.

7. The multi-stage power supply of claim 6, wherein said range of frequencies has an average frequency equal to a desired frequency, and said range of frequencies deviates from said desired frequency by an amount not exceeding a desired tolerance.

8. The multi-stage power supply of claim 7, wherein said desired frequency is 200 kHz.

9. The multi-stage power supply of claim 8, wherein said range of frequencies is bounded by 180 kHz and 220 kHz.

10. A method for converting DC power to AC power in an inverter comprising the steps of;
    boosting a DC voltage from a power source in a DC boost stage;
    converting said boosted DC voltage into an AC power signal in an inverter stage; and
    controlling said boost stage and said inverter stage using counter synchronous signals created by a single controller.

11. The method of claim 10, comprising the additional step of reducing electromagnetic noise by ensuring a control signal for controlling said boost stage is consistently out of phase with control signals for controlling said inverter stage.

12. The method of claim 11, wherein the control signal for controlling said boost stage is 90 degrees out of phase with said control signals for controlling said inverter stage.

13. The method of claim 10, comprising the additional step of varying a frequency of the counter-synchronous control signals, thereby spreading electromagnetic noise across a frequency band.

14. The method of claim 13, wherein said frequency variation is random.

15. A non-transitory computer readable medium storing instructions for performing the steps of:
   boosting a DC voltage from a power source in a DC boost stage;
   converting said boosted DC voltage into an AC power signal in an inverter stage; and
   controlling said boost stage and said inverter stage using counter synchronous signals created by a single controller.

16. The non-transitory computer readable medium of claim 15, storing further instructions for performing the step of reducing electromagnetic noise by ensuring a control signal for controlling said boost stage is consistently out of phase with control signals for controlling said inverter stage.

17. The non-transitory computer readable medium of claim 15, storing further instructions for performing the step of varying a frequency of the counter-synchronous control signals, thereby spreading electromagnetic noise across a frequency band.

* * * * *